(12) United States Patent
Osipchuk et al.

(10) Patent No.: US 6,628,385 B1
(45) Date of Patent: Sep. 30, 2003

(54) HIGH EFFICIENCY, LARGE FIELD SCANNING MICROSCOPE

(75) Inventors: Yuri Osipchuk, Foster City, CA (US); Sasha Dromaretsky, Irvine, CA (US); Yuriy Roll, Foster City, CA (US); Stephen Smith, Los Altos, CA (US)

(73) Assignee: Axon Instruments, Inc., Foster City, CA (US)

( * ) Notice: Subject to any disclaimer, the term of this patent is extended or adjusted under 35 U.S.C. 154(b) by 0 days.

(21) Appl. No.: 09/479,310

(22) Filed: Jan. 6, 2000

Related U.S. Application Data (60) Provisional application No. 60/118,960, filed on Feb. 5, 1999.

(51) Int. Cl.⁷ ............................................... G01N 21/64
(52) U.S. Cl. ..................... 356/318; 356/417; 250/458.1
(58) Field of Search ................................. 356/317, 318, 356/417; 250/458.1, 459.1, 461.1, 461.2

(56) References Cited

U.S. PATENT DOCUMENTS

| | | | |
|---|---|---|---|
| 3,490,829 A | 1/1970 | Weibrecht | |
| 3,941,477 A | 3/1976 | Schodl | |
| 4,154,529 A | 5/1979 | Dyott | |
| 4,243,318 A | 1/1981 | Stöhr | |
| 4,417,789 A | 11/1983 | Kano | |
| 4,462,686 A | 7/1984 | Bridges | |
| 4,573,796 A | 3/1986 | Martin et al. | |
| 4,595,295 A | 6/1986 | Wilczynski | |
| 4,730,922 A | 3/1988 | Bach et al. | |
| 4,745,285 A | 5/1988 | Recktenwald et al. | |
| 4,768,886 A | 9/1988 | Hirschfeld et al. | |
| 4,796,964 A | 1/1989 | Connell et al. | |
| 4,803,049 A | 2/1989 | Hirschfeld et al. | |
| 4,929,561 A | 5/1990 | Hirschfeld | |
| 5,001,691 A | 3/1991 | Antonov et al. | |
| 5,062,714 A | 11/1991 | Peterson et al. | |
| 5,062,942 A | 11/1991 | Kambara et al. | |
| 5,065,008 A | 11/1991 | Hakamata et al. | |
| 5,106,387 A | 4/1992 | Kittrell et al. | |
| 5,125,404 A | 6/1992 | Kittrell et al. | |
| 5,127,730 A | 7/1992 | Brelje et al. | |
| 5,459,325 A | * 10/1995 | Hueton et al. | 250/458.1 |
| 5,471,294 A | * 11/1995 | Ogino | 250/461.2 |
| 5,549,805 A | 8/1996 | Middendorf et al. | |
| 5,571,388 A | 11/1996 | Patonay et al. | |
| 5,639,874 A | 6/1997 | Middendorf et al. | |
| 5,682,038 A | 10/1997 | Hoffman | |
| 5,760,900 A | 6/1998 | Ito et al. | |
| 5,953,120 A | 9/1999 | Hencken et al. | |
| 6,023,071 A | 2/2000 | Ogura et al. | |
| 6,355,934 B1 | 3/2002 | Osgood et al. | |

FOREIGN PATENT DOCUMENTS

| | | |
|---|---|---|
| EP | 0 539 471 B1 | 12/1995 |
| EP | 0814594a2 | 12/1997 |
| WO | WO 98/48262 | 10/1998 |

* cited by examiner

Primary Examiner—F. L. Evans
(74) Attorney, Agent, or Firm—Dorsey & Whitney LLP (57) ABSTRACT

A fluorescent optical imaging system (10) produces two separate spots ($S_1$ and $S_2$) on a sample (12) by a pair of excitation laser beams ($B_1$ and $B_2$) that are generated by first and second lasers ($L_1$ and $L_2$). Excitation laser beams ($B_1$ and $B_2$) pass at slightly different angles, first through an aperture (15) of a 45° fold mirror (13), and then through an objective element (14). As a result, emission light beams (16, 18) are generated from each illuminated spot ($S_1$ and $S_2$) and are reflected and redirected by mirror (13) through a secondary lens (19) before reaching one of two detectors (PMT 1 and PMT 2). Emission beam (16) reflects off a second 45° mirror (22) prior to reaching detector (PMT 1), while emission beam (18) travels directly to (PMT 2). If desired, optical separation elements (24), such as dichroic filters, prisms, or gratings, can be positioned in front of each detector (PMT 1 and PMT 2). Fluorescent optical imaging system (10) may employ a scanning system (17) for illuminating and imaging the entire area of sample (12).

37 Claims, 7 Drawing Sheets

HIGH EFFICIENCY, LARGE FIELD SCANNING MICROSCOPE

RELATED APPLICATION

This application claims priority under 35 U.S.C. §119(e) to provisional application Ser. No. 60/118,960, filed Feb. 5, 1999.

TECHNICAL FIELD

The present invention pertains to fluorescent optical imaging systems and, more particularly, to a non-confocal fluorescence imaging system for broad scale imaging of relatively large samples.

BACKGROUND OF THE INVENTION

The present invention relates to the simultaneous imaging of two or more fluorescently-labeled samples in a scanning optical microscope. The field of view obtained with this system is substantially larger than conventional fluorescence microscopes, in which the field of view is typically limited by the optical design of the objective lens. This invention can be applied to, but is not limited to, samples such as DNA microarrays or tissue microarrays, where short depth of focus is not required, and, in fact, would degrade system performance (Cheung, V. G., M. Morley, F. Aguilar, A. Massimi, R. Yucherlapati and G. Childs, "Making and reading microarrays," *Nature Genetics Supplement 21:15–19* (1999)). It is also suitable for samples that implement fluorescent labels with small Stokes shifts and/or overlapping absorption and emission spectra.

Difficulties can arise in fluorescence microscopy when imaging multiple fluors with close spectral properties. It can be impractical to excite only one fluor with a source (e.g. laser) beam due to the overlap of absorption spectra or the spectral bandwidth of the source. The spectral emission ranges from multiple fluors may overlap, making it difficult to direct the emission from each fluor efficiently to a single detector, without crosstalk. Even if the emission ranges don't overlap, they may be close enough to make it difficult to obtain an effective optical component (e.g. filter, grating, or prism) for separating them. One solution is to scan each wavelength independently, and then assemble a composite image from multiple scans. However, speed and image registration become issues in this case.

U.S. Pat. No. 5,304,810 of Amos discloses a scanning confocal microscope where two or more source beams with different angular orientations illuminate two distinct spots on a sample located in the object plane of a microscope objective. The resulting reflected or fluorescent light is detected by an equal number of spaced detectors, each one receiving light from a single illuminated spot. With this system, the region from which light is collected by each detector (its "field of view") is spatially limited to nearly the same area as the excitation spot size.

An advantage of the system of Amos is that it achieves high spatial resolution at each distinct point illuminated on the specimen, which for many imaging applications is highly desirable. However, for other applications, a lower resolution image suffices.

Shalon, D., S. Smith and P. O. Brown, "A DNA microarray system for analyzing complex DNA samples using two-color fluorescent probe hybridization," *Genome Research* 6:639–645 (1996) describe a scanner for dual wavelength fluorescence detection of DNA microarrays that illuminates sizable spots on the sample. This is accomplished by intentionally underfilling the objective entrance pupil (i.e. the back aperture), which, by reducing the numerical aperture (NA) of the converging beam, increases the diffraction limited spot size in the focal plane. Note that substantially underfilling the objective aperture with a single-transverse-mode laser beam likely results in a Gaussian intensity distribution in the focal plane, whereas overfilling the objective aperture, as is often done in laser scanning microscopy, produces a distribution in the focal plane that approaches an Airy function.

As is well known in the field, it is possible to improve the axial resolution (reduce the depth of focus) of an optical microscope by implementing it as a confocal design. The essential benefit of a confocal microscope is the rejection of light from out-of-focus planes, allowing imaging of thick samples without blurring (Corle, T and G. Kino, *Confocal Scanning Optical Microscopy and Related Imaging Systems*, Academic Press, San Diego 1996). Cheung et al. (1999) observed that a confocal configuration actually reduced the signal-to-noise ratio, and was therefore not beneficial, in scanning microarrays. Furthermore, the depth-of-focus produced in a high numerical aperture confocal system is substantially less than the typical flatness of a microscope slide. This can also be an issue in a non-confocal high NA system, but is more readily overcome. For example, in the present invention low NA source beams are combined with large area detectors to reduce the sensitivity to defocus.

U.S. Pat. No. 5,459,325 of Heuton and Van Gelder discloses a high-speed fluorescence scanner that implements a light weight scan head containing a lens and mirror. This design has the advantage of variable field of view. However, it relies on a spectral dispersion device for separating the excitation and emission beams. As discussed above, there are practical obstacles to spectral beamsplitting that limit its flexibility in some applications. Thus, an efficient, multi-wavelength scanning system for measurement of samples that do not benefit from strict depth discrimination is needed. Furthermore, it should overcome the limitations of spectral beamsplitting to allow free use of available fluors. The present invention is directed at providing a solution to this problem.

DISCLOSURE OF THE INVENTION

The fluorescent optical imaging system of the present invention, originally designed for the purpose of imaging hybridized DNA chips, has a wide range of potential capabilities. A first aspect of the imaging system of the present invention comprises an optical source for generating at least two excitation beams with spatial separation for illuminating on a sample at least two distinct illuminated spots that are spaced apart a predetermined distance, with the illuminated spots generating at least two emission beams spatially or angularly separated, a detector for receiving each emission beam, and an objective element for directing the excitation beams onto the sample. Each detector has a field of view (receives light from a region) on the sample that is larger than an illuminated spot, but encompasses only a single illuminated spot.

According to an aspect of the invention, the objective element includes a scanning mechanism for directing the excitation beams onto an area of the sample. Preferably, the scanning mechanism includes means for moving the objective element in a first direction. With this embodiment, the system further comprises means for moving the sample in a second, typically perpendicular direction. Data processing controls and suitable imaging techniques are used to create an image of a scanned sample.

According to another aspect of the invention, the optical source and the objective element generate the illuminated spots in a manner creating spots that are relatively large spots as compared to diffraction limited spots of a moderate to high numerical aperture (NA) microscope objective, such as typically used in a confocal microscope. This is an important feature of one aspect of the invention, and is discussed in more detail herein.

According to another aspect of the invention, there is spatial separation of the two excitation beams. Preferably, the excitation beams are angularly offset with respect to each other. In addition, the system further comprises means for spatially separating the emission beams and redirecting the emission beams, each towards their own respective detector. Spatial separation of the excitation and emission beams is achieved, preferably, by means of a mirror with a small optical hole. However, other designs are possible, such as a small mirror that is smaller than an emission beam, or a prism.

According to another aspect of the invention, each detector is displaced from a focal point of its respective emission beam. This provides a degree of de-focus, which allows for broader imaging techniques, as discussed herein.

A second aspect of the imaging system of the present invention comprises an optical source for generating an excitation beam to be directed at a sample to be imaged in a manner generating an emission beam from the sample, a detector for receiving the emission beam from the sample, an objective element between the optical source and the sample for directing the excitation beam onto the sample and for receiving the emission beam from the sample in a manner where the excitation beam and emission beam at least partially occupy the same space, and an optical element for geometrically separating the excitation beam from the emission beam and directing the emission beam towards the detector. At the point of separation of the two beams, the excitation beam partially occupies the emission beam.

According to an aspect of this embodiment of the imaging system, the excitation beam occupies a part of the objective element and the emission beam occupies substantially all of the objective element. Preferably, the objective element is a lens, however, a parabolic mirror could also be used, as well as a number of other dioptric, catoptic, and catadioptric imaging systems.

According to another aspect of the invention, the optical element includes a mirror with a small hole. Alternative designs for the optical element, also referred to as a beamsplitter herein, include a small mirror that is smaller than an emission beam, a prism, and several other designs as described below.

According to another aspect of the invention, the excitation beam occupies a small percentage of the space occupied by the emission beam.

According to yet another aspect of the invention, the optical source is adapted to generate first and second excitation beams to be directed by the objective element toward the sample in a manner generating first and second emission beams. Preferably, the first and second excitation beams are angularly displaced from each other. Alternatively, however, the first and second excitation beams may be parallel to each other. For this alternative design, the objective element may include first and second objective lenses, one for each excitation beam.

These and other features and advantages of the present invention will become more apparent from the following detailed description of the invention, when read in conjunction with the drawings and the claims, which are all incorporated herein as part of the disclosure of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

The disclosure herein is intended to present a general description of the system, discussing such attributes as field-of-view, resolution, magnification, radiometric efficiency, and imaging modes. Several potential variations of the system are described.

1. System Description

Figure 1:
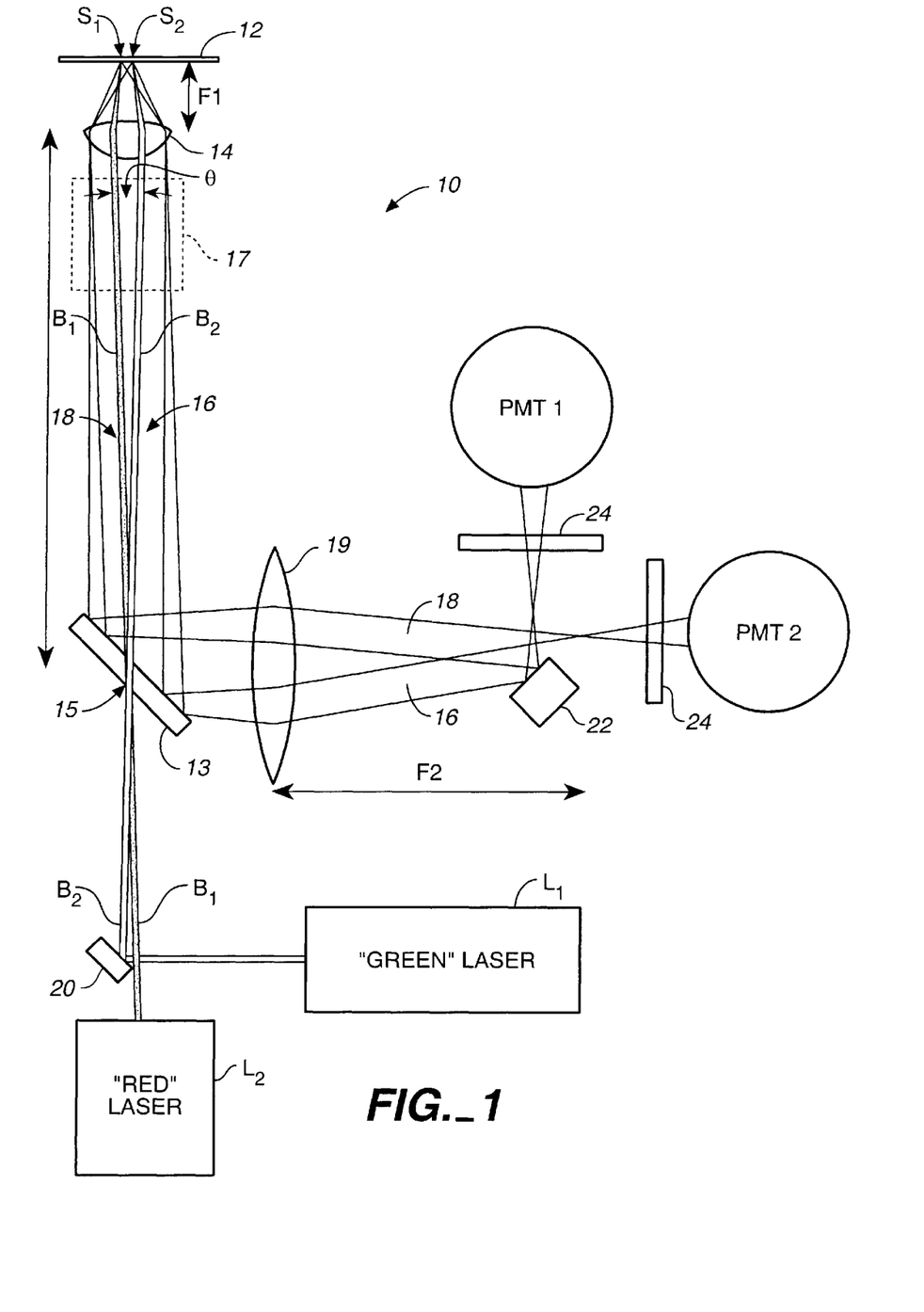
FIG. 1 is a schematic diagram of the optical imaging system of the present invention.

Referring to FIG. 1, the fluorescent optical imaging system 10 of the present invention is disclosed herein for use in a scanning optical microscope, but has broader applications, as discussed later. Two separate spots $S_1$ and $S_2$ are illuminated on a sample 12 by a pair of excitation laser beams $B_1$ and $B_2$ that are generated by first and second lasers $L_1$ and $L_2$. Each of the laser sources $L_1$ and $L_2$ actually contains several components (e.g. a frequency doubling crystal to obtain the 532 nm beam). Excitation laser beams $B_1$ and $B_2$ pass at slightly different angles, first through an aperture 15 of a 45° fold mirror 13, and then through an objective element 14, shown in FIG. 1 as a lens. As a result, emission light beams 16, 18 are generated from each illuminated spot $S_1$ and $S_2$ and are reflected and redirected by mirror 13 through a secondary lens 19 before reaching one of two detectors PMT 1 and PMT 2. Emission beam 16 reflects off a second 45° mirror 22 prior to reaching detector PMT 1, while emission beam 18 travels directly to PMT 2. If desired, optical separation elements 24, such as dichroic filters, prisms, or gratings, can be positioned in front of each detector PMT 1 and PMT 2. It is understood that the optimum relative positions of optical separation elements 24 and their respective detectors, PMT 1 and PMT 2, may be somewhat different than shown in FIG. 1.

Fluorescent optical imaging system 10 may employ a scanning system, indicated in phantom generally by reference numeral 17, for illuminating and imaging the entire area of sample 12. Preferably, scanning system 17 uses an objective lens scanner for one axis and a sample (stage) scanner for the other, orthogonal axis. Scanning system 17 is discussed in more detail later with reference to FIG. 3.

A variety of techniques may be employed for generating an angular offset as indicated by angle θ for excitation beams $B_1$ and $B_2$. One of beams $B_1$ and $B_2$ may be directed through a 45° fold mirror 20 such that beams $B_1$ and $B_2$ enter the optical scanning system with a slight angular offset between their propagation directions. With this design, the excitation beams themselves are collimated or nearly collimated.

The size of the illuminated region of spots $S_1$ and $S_2$ on sample 12 is determined by the excitation beam diameters, the focal length $F_1$ of the objective lens 14, and the degree of defocus of the sample. Preferably, the excitation beam diameters are much smaller than the entrance pupil of the objective lens. The entrance pupil is the image of the aperture stop as seen from the source and detectors (rather than sample) side of the lens.

Objective element 14 is an aspheric singlet lens. The nominal sample focus is midway between the foci of the two excitation beams (the foci being separated axially due to axial chromatic aberration). In the current implementation, the illumination spots $S_1$ and $S_2$ are on the order of 5–10 μm in diameter. The desired spot size and axial separation can be adjusted by causing one or both of the excitation beams $B_1$ and $B_2$ to be slightly converging or diverging, rather than collimated. The lateral offset between the two spots is set by the angle θ of the excitation beams and the focal length of the objective lens. As discussed later, objective element 14 may alternatively include other designs.

Fluorescent optical imaging system 10 employs two detectors PMT 1 and PMT 2, each collecting light emitted from one of the two illuminated spots $S_1$ and $S_2$. Detectors PMT 1 and PMT 2 are prevented from receiving light emitted from the incorrect illumination spots by 45° mirror 22 that redirects emission beam 16, effectively splitting the sample into two regions, each "seen" by a single detector. Detectors PMT 1 and PMT 2 may include PMT, photodiode, avalanche photodiode, CCD, and other optical detectors.

Figures 2, 5:
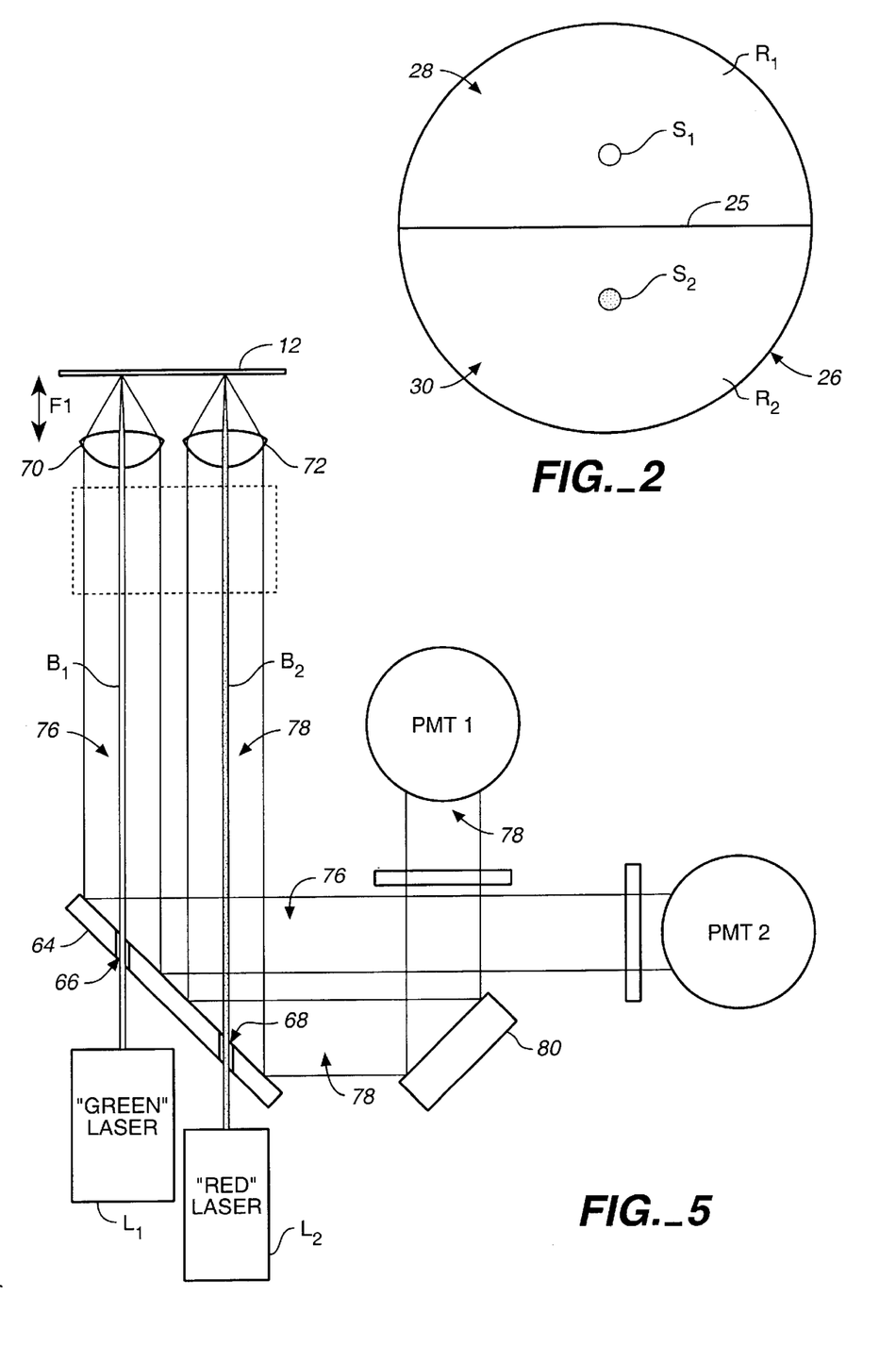
FIG. 2 is a schematic diagram contrasting the excitation spot size and emission field of view of the optical imaging system of FIG. 1.
FIG. 5 is a schematic embodiment of another alternative embodiment of a parallel, dual-beam imaging system.

Referring to FIG. 2, each detector "sees" one of two (or more in the general case) non-overlapping regions $R_1$ and $R_2$ of the sample, with a border 25 between these regions determined by the position of mirror 22 relative to secondary lens 19, as shown in FIG. 1. In a preferred embodiment, excitation spots $S_1$ and $S_2$ are on the order of 5–10 μm in diameter. The size of these spots is determined by the diameters and wavelengths of the incident laser beams $B_1$ and $B_2$ and the fact that these beams do not fill the full aperture of objective lens 14. Preferably, the distance between these spots is approximately 70 μm. In contrast, for a confocal microscope, a typical excitation spot size on a sample is on the order of 1 μm or less, due to the fact that the spot is determined by the diffraction limited spot size of a moderate to high NA microscope objective lens.

To obtain the desired size of the illuminated spots $S_1$ and $S_2$ in the current invention, the entrance pupil of objective lens 14 is underfilled by directing laser beams $B_1$ and $B_2$ to the lens directly, rather than expanding them to the diameter of the entrance pupil. This arrangement avoids use of a dichroic mirror to separate excitation light and emission light, as is commonly done with confocal microscopes and other optical scanning systems. Instead, a 100% (ideally) reflective mirror 13 with a 1 mm hole 15 at its center is provided. The hole could be circular or elliptical or a slit.

The excitation light beams (typically 0.8 mm in diameter) pass through the hole, while fluorescent emission light reflects from the mirror and passes through a barrier filter, if necessary, to remove scattered excitation light and through secondary lens 19 to the light detectors PMT 1 and PMT 2.

The field of view of detectors PMT 1 and PMT 2 also differs from the field of view of the detectors in a typical confocal microscope. Note that field of view in this context refers to the image of the detector or detector aperture on the sample, not the total size of the scanned region. As shown in FIG. 2, the complete field of view of the detectors in the present invention is that of region 26, which encompasses both excitation spots $S_1$ and $S_2$ While shown as a circle in FIG. 2, it is understood that region 26 may have other shapes. For example, the field of view may be 200 mm across at sample 12. Mirror 22 placed before detectors PMT 1 and PMT 2 splits the field of view into two halves 28, 30 so that each detector "sees" approximately half of the full field of view. In contrast, the field of view of a confocal microscope is spatially limited to 1 mm or less, nearly the same size as the excitation spot, which is necessary to maximize the lateral higher resolution. The field of view in a confocal microscope is typically limited by an aperture placed in front of the detector.

One additional difference between the present system and a confocal system has to do with the depth of field (axial resolution). In a typical high-magnification confocal microscope, the use of a detector aperture to reject out-of-focus light limits the depths of field to 1 mm or less. Since the optical system of the present invention does not actively reject out of focus light with detector apertures or small detectors, the depth of field is significantly greater than a confocal microscope.

As with all scanning optical microscopes, imaging system 10 creates an image by sequentially acquiring pixel data (e.g. fluorescence) and constructing an image with known computer graphics techniques. With two excitation beams having a small lateral offset between their test locations on the sample, the present system forms two complete images with a known lateral offset between them. Scanning is performed in the two lateral directions.

Figure 3:
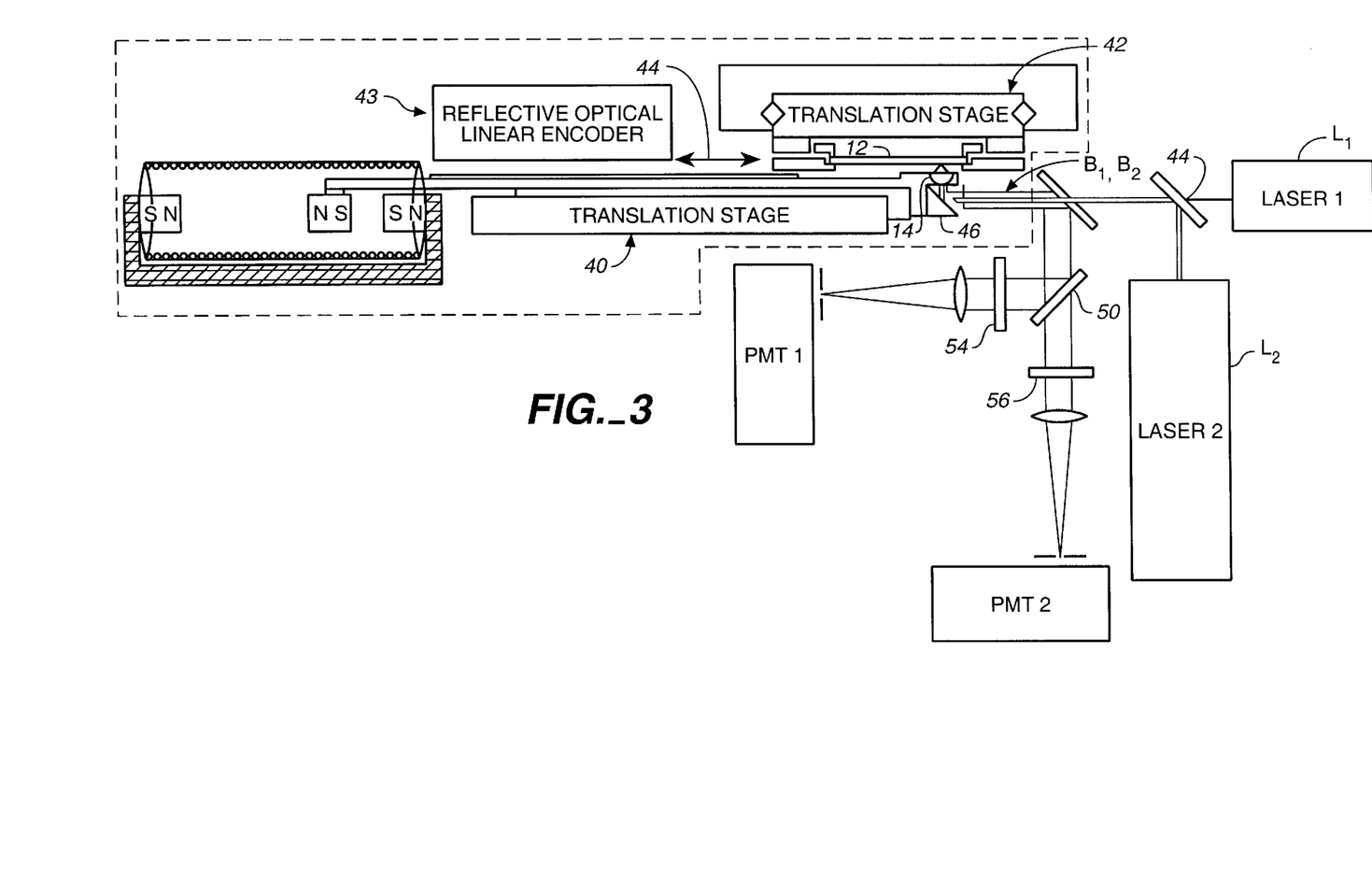
FIG. 3 is a schematic diagram of a first practical embodiment of the optical imaging system of FIG. 1.

In a first practical embodiment of the system, as shown in FIG. 3, there are two scanning mechanisms employed, each in the form of a translation stage 40, 42. Translation stage 40 is accompanied by a linear encoder assembly 43. In a fast-scan direction, as indicated by arrow 44, the excitation beams $B_1$ and $B_2$ enter the scanner stage area in an approximately horizontal orientation, are reflected up towards a sample 12 by a fold mirror 46, and are then focused by objective lens 14 onto sample 12. Movement of translation stage 40 in the direction of arrow 44 provides movement in a first direction, where the measurement location on the sample is determined by the optical axis of objective element 14. The slow-axis scan is implemented by moving sample 12 via translation stage 42 in a second direction orthogonal to the first scan direction, which second direction is into and out of the page as shown.

FIG. 3 also illustrates an alternative two-wavelength version of the imaging system of the present invention. Additional dichroic beamsplitters 44, 50 and bandpass filters 54, 56 are used to mix light from several lasers together (two lasers shown) and to separate fluorescent emission light to several bands. This arrangement can be used for simultaneous scanning with multiple source and detection wavelengths. As discussed below regarding the beamsplitter shown in FIG. 10, the performance of this design can be limited by the characteristics of the dichroic beamsplitters.

2. Alternate Design Forms

Slight variations to the design of the present system can make it a general purpose microscope or can tailor it for specific applications. These variations include the beam source or sources, beamsplitting, detection, and scanning attributes, as discussed herein.

A) Beam Sources

A number of alternate excitation light source configurations can be implemented in this system. The simplest case is the use of a single on-axis laser beam. The sample location will be at the focal point of the objective lens (assuming a collimated laser beam). The portion of the lens through which the beam travels does not vary with scan position. This is somewhat simpler than the general implementation shown in FIG. 1, in which the finite angles the two excitation beams make with the optical axis causes them to move towards and away from the center of the objective lens during each scan of the lens. This produces slightly varying illumination conditions throughout the scan, something that does not occur with beams coaxial with the lens axis. It is also possible to use two or more coaxial source beams. In this case, they will illuminate the same spot on the sample (neglecting chromatic aberration).

It is also possible to obtain separate illumination spots by using two parallel beams, each of which illuminates a portion of the objective lens aperture. The individual beams converge as separate cones of light, and are coincident in the focal plane of the lens (assuming collimated source beams incident on the objective lens). A disadvantage of this technique compared to the angled beams is that the separation between the two converging beams varies with defocus of the sample, and will be impacted by vertical runout (defocus) during the scan. As the sample comes closer to the focus of the lens, the two illumination spots will approach each other. In the angular offset case of the current design, this effect is much less pronounced (the two spots are never coincident, assuming the two beams cross in front of the objective lens rather than between the lens and sample). The effect of runout on separation between the illumination spots can be minimized in the current invention by causing the two illumination beams to cross at or near the front focal point of the objective lens.

Multiple beams may come from one or more sources, and may or may not have different spectral characteristics. It is also possible to bring one or both of the source beams in from above the sample (opposite the objective lens). This is discussed below in the trans-illumination section of alternate imaging modes.

Smaller illumination spots may be obtained by increasing the diameter of the source beams (e.g. by passing the beams through a spatial filter/beam expander) and overfilling the entrance pupil of the objective lens. The spatial filter consists of a positive lens to focus the beam and a pinhole intended to pass only the central lobe of the diffraction (Airy) pattern. The beam expands beyond the pinhole and is collimated by another lens. This beam is then focused on the sample by the objective lens, producing a diffraction limited illumination spot. In this implementation, the illumination spots produced by two angled source beams will be separated only in the immediate region of the focus, and a well-corrected objective lens may be required to obtain adequate performance.

Figure 4:
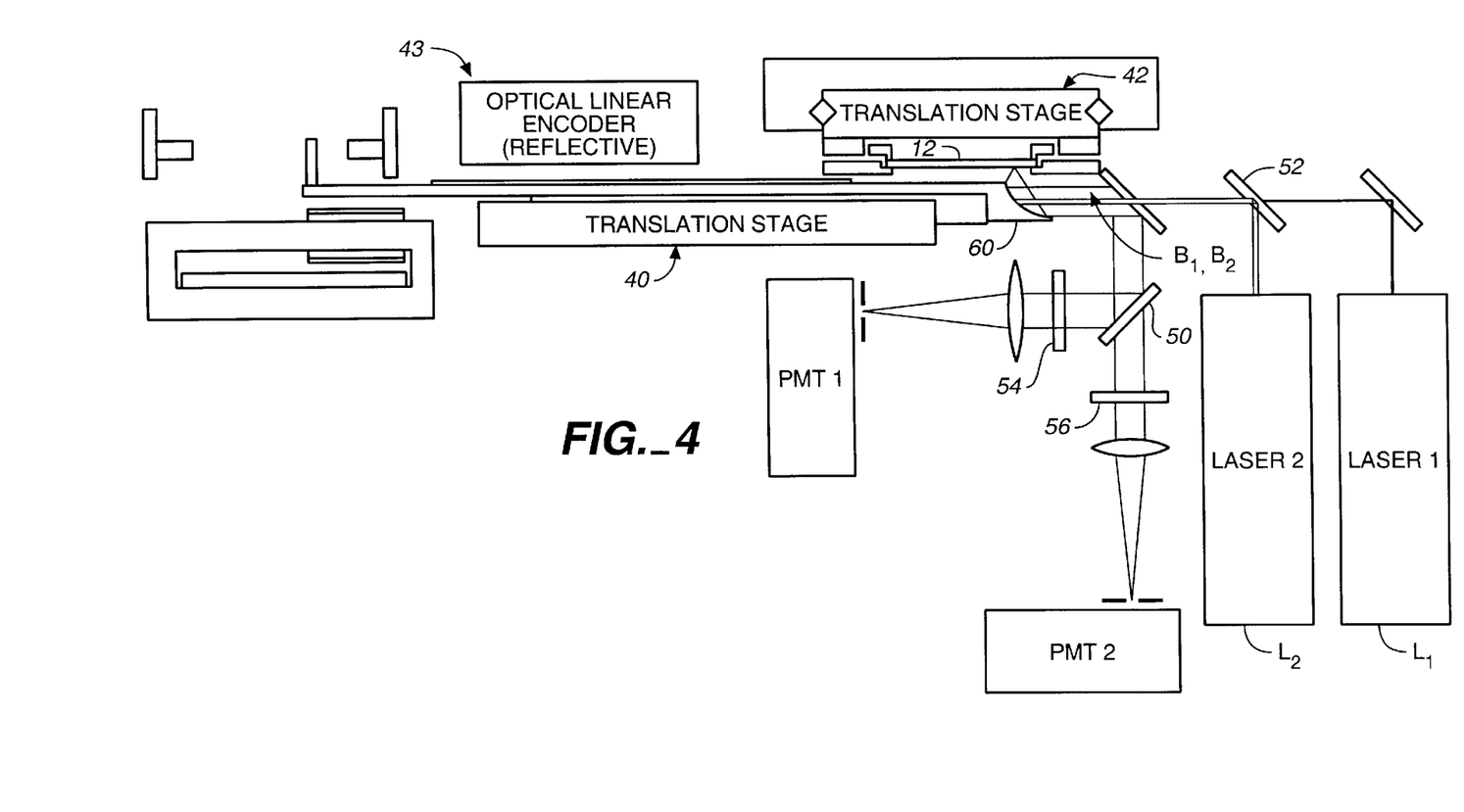
FIG. 4 is a schematic diagram like FIG. 3 of a second practical embodiment where the mirror and objective lens are replaced with a parabolic mirror.

FIG. 4 illustrates a variation on the design of FIG. 3. In this embodiment, a single off-axis parabolic mirror 60 is used in place of the combination objective lens and 45° mirror. Parabolic mirror 60 performs multiple functions. It turns the axis of the incoming laser beams $B_1$ and $B_2$ by 90°; it focuses those beams into waists coinciding with the sample surface 12; it collects and recollimates fluorescence emissions, and turns the emissions beams by 90°.

FIG. 5 illustrates a split, parallel dual beam system. Excitation light beams $B_1$ and $B_2$ are generated by separate lasers $L_1$ and $L_2$ in a parallel orientation. A mirror 64 with two holes 66, 68 is provided in the path of excitation beams $B_1$ and $B_2$ to direct the beams at two adjacent objective lenses 70, 72. A pair of illuminated spots $S_1$ and $S_2$ are generated, fluorescence emissions from which are collimated by objective lenses 70, 72 as emission beams 76, 78. Mirror 64 redirects emission beams 76, 78 in a spatially separated manner toward detectors PMT 1 and PMT 2, with a 45° mirror 80 provided for emission beam 78. This optical layout removes the need for a secondary lens, although one can be included if beneficial.

B) Beamsplitter

The optical system of the present invention utilizes a novel design for a beamsplitter, which in FIG. 1 is illustrated in the form of a mirror with a small hole. An enlarged illustration of this design in shown in FIG. 6. Excitation beams $B_1$ and $B_2$ (two in the illustrated system, but one or more in the general case) pass through hole 15 in the center of mirror 13. The objective side of mirror 13 includes a reflective coating 84 for redirecting emission light beams 16, 18.

Figure 6:
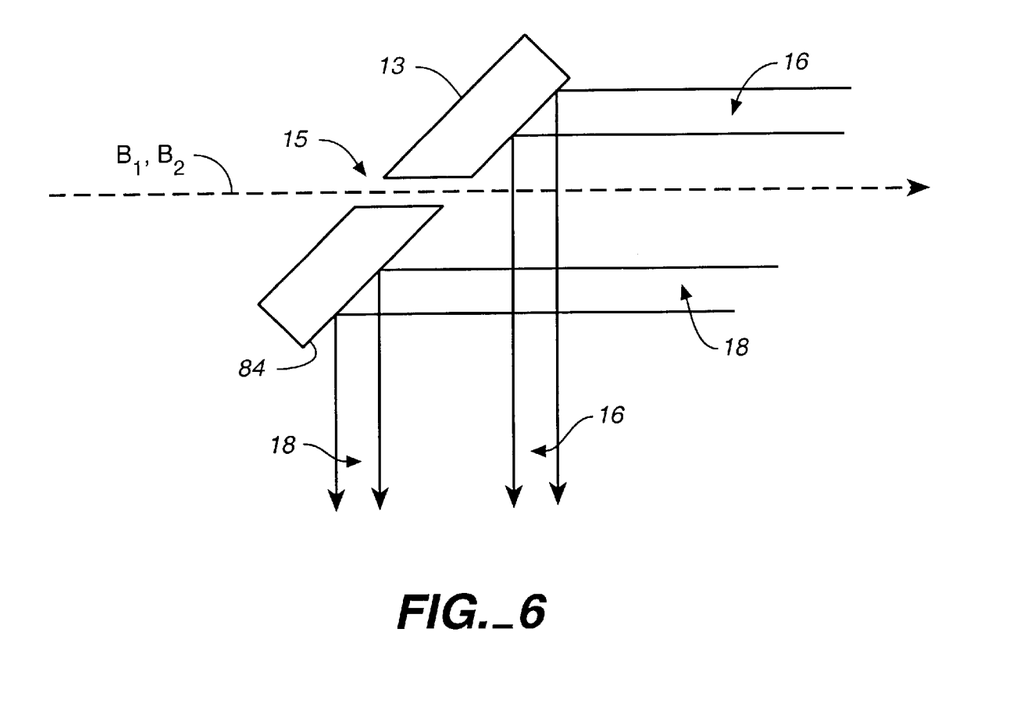
FIG. 6 is an enlarged schematic diagram of the beamsplitter of FIG. 1.

The fluorescent emission light 16, 18 emitted from the sample returns along the same direction, but with a much larger diameter than excitation beams $B_1$ and $B_2$. Specifically, excitation beams $B_1$ and $B_2$ have a smaller diameter than the entrance pupil of the objective lens, while the collected emission light 16, 18 has the diameter of the objective pupil (assuming collimated emission beams). Due to the large disparity between the diameters of the excitation and emission beams, only a small amount of emission light is lost through the hole 15 in the center of mirror 13, making this an effective beamsplitter.

Beams $B_1$ and $B_2$ in FIG. 6, as well as in FIGS. 7–13, are shown to be coaxial for illustrative purposes. They may or may not be coaxial in practice.

Figure 7:
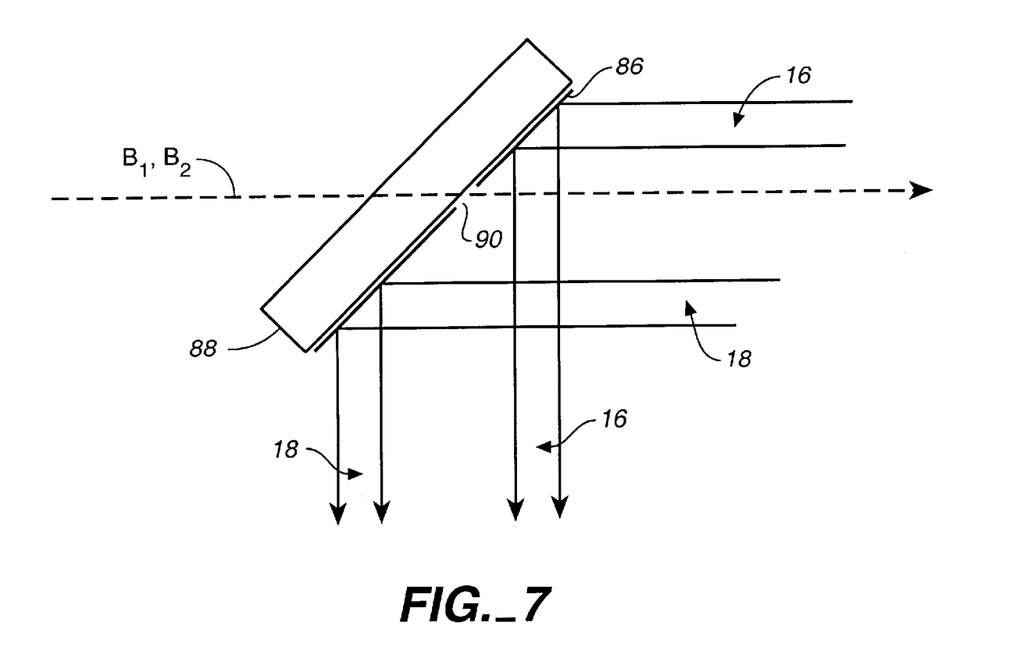
FIGS. 7–13 are alternative designs for beamsplitters.

As shown in FIG. 7, the hole in the center of the mirror can be created by placing a reflective coating 86 on one surface of an optical window 88, leaving a small region 90 in the center uncoated (or anti-reflective coated).

Figure 8:
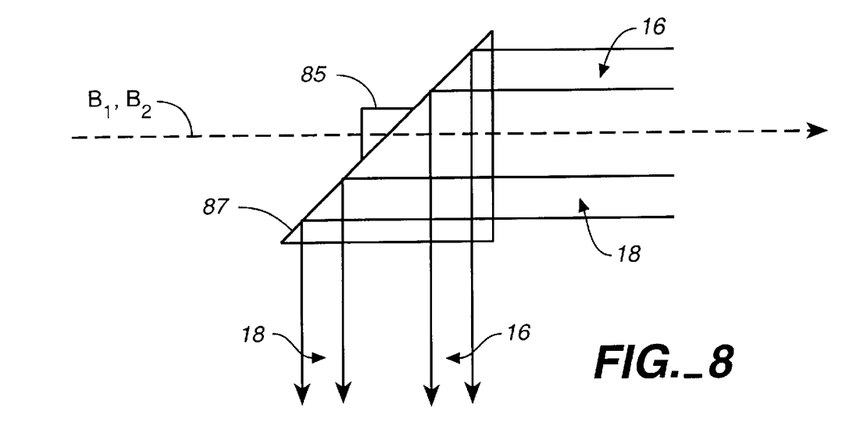

The reflective coating may be replaced by a totally internally reflecting surface, as shown in FIG. 8. In this case, a small prism 85 and a large prism 87 are combined such that the illumination beams $B_1$, $B_2$ enter the small prism, passes through the interface between the prisms, and exits the large prism. The emission beams 16, 18, which have a much larger diameter than the illumination beam, enter large prism 87 but do not pass through to small prism 85 except where the two prisms are in contact. Instead, the majority of the beam is totally internally reflected and exits the other face of the large right-angle prism.

Figure 9:
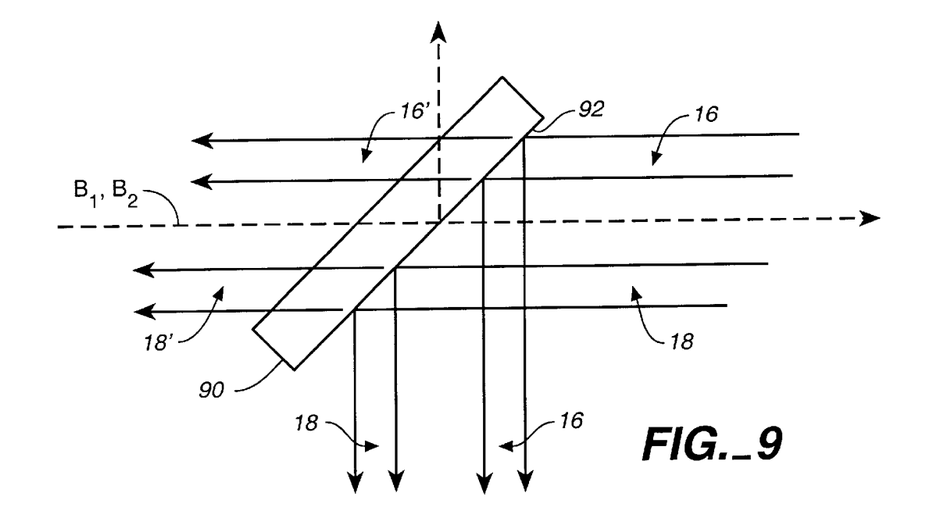

Another example is shown in FIG. 9, where a transparent mirror substrate 90 (optical window) has a partially reflective coating 92 on one surface. In this embodiment, a portion of emission beams 16' and 18' travel back through the optical window 90.

In this design, the partially reflective coating causes a portion (e.g., 50%) of any beam impinging on it to be reflected, and the remaining portion transmitted (neglecting absorption). This is a common design for comparable illumination (excitation) and detection (emission) beam diameters. However, it suffers from a minimum of 75% loss (the illumination beam is transmitted through the beamsplitter and the detection beam reflected off it, or vice-versa). In the present system, where the excitation beam is substantially smaller in diameter than the emission beam, this loss is unnecessarily high and for this reason is not a preferred arrangement. A plate beamsplitter is shown in FIG. 9, but this type of beamsplitter can also be implemented in other forms, such as a cube or a pellicle.

A variation on the design shown in FIG. 9 employs a polarizing beamsplitter and quarter-wave plate to improve the efficiency of the system. In this case, the beamsplitter reflects linearly polarized light, which is then converted to circularly polarized light by the quarter-wave plate. Upon reflection from the sample, the return beam is converted by the quarter-wave plate back into linearly polarized light, but now with the correct polarization to be transmitted by the polarizing beamsplitter. The order of reflection and transmission by the polarizing beamsplitter may be reversed. This polarization technique is typically used in reflection, rather than fluorescence, due to the preservation of polarization.

Figure 10:
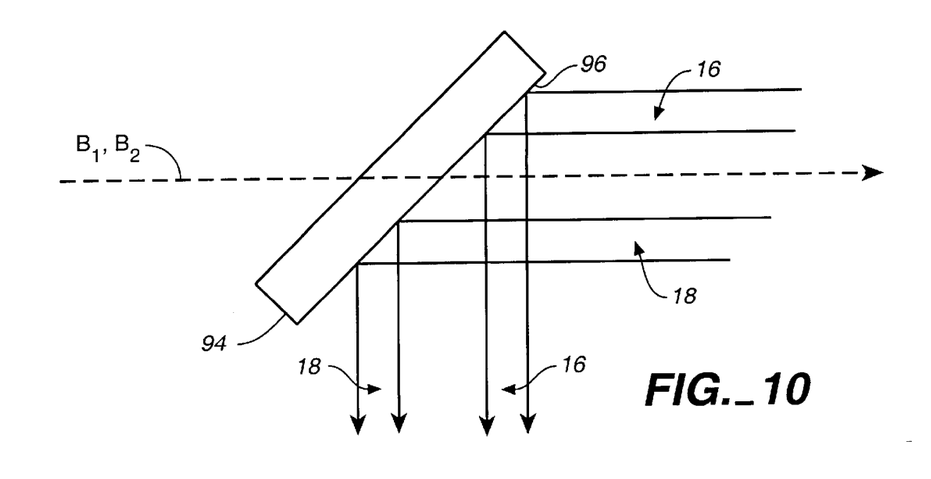

Yet another beamsplitter example is shown in FIG. 10, where a dichroic beamsplitter 94 is employed having a dichroic coating 96. The dichroic beamsplitter design utilizes a beamsplitter coating that reflects (or transmits) one or more wavelength ranges while transmitting (reflecting) other wavelength ranges. This is an efficient solution in fluorescence operation where the illumination wavelengths and emission wavelengths are spectrally shifted from one another. However, the practical limitations of thin film coatings and the overlap between absorption and emission spectra of fluorescent dyes prevent this from being a perfect solution in fluorescence microscopy.

Figure 11:
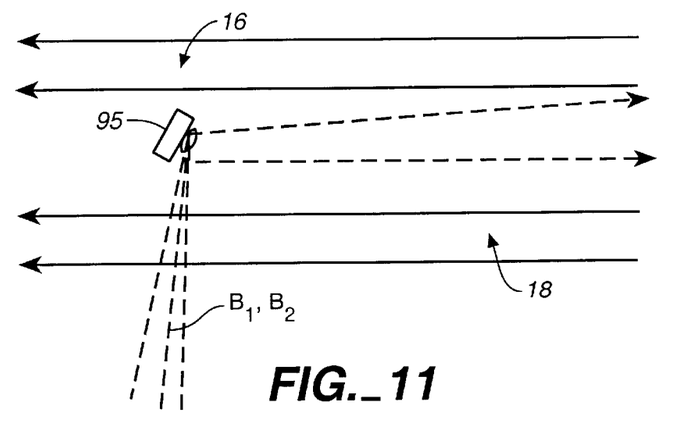

Yet still another example of a beamsplitter is shown if FIG. 11. A small mirror 95 reflects excitation beams $B_1$ and $B_2$ while emission beams 16, 18 pass primarily around the mirror. FIG. 11 shows essentially the reciprocal case of FIG. 6. Rather than transmitting the excitation beam(s) through a small hole in a mirror that reflects the detection beam, as is done with the beamsplitter of FIG. 6, the beams are reflected from a small mirror 95, while emission beams 16, 18 are transmitted around the mirror. The small mirror can also be implemented by placing a reflective coating on only a small region of an optical window, with the rest of the window left uncoated (or with an anti-reflection coating). Alternatively, the mirror could collimate (or otherwise image) the excitation beams, as well as reflecting them. This may be suitable for a fiber source brought in from the side of the beam.

Figure 12:
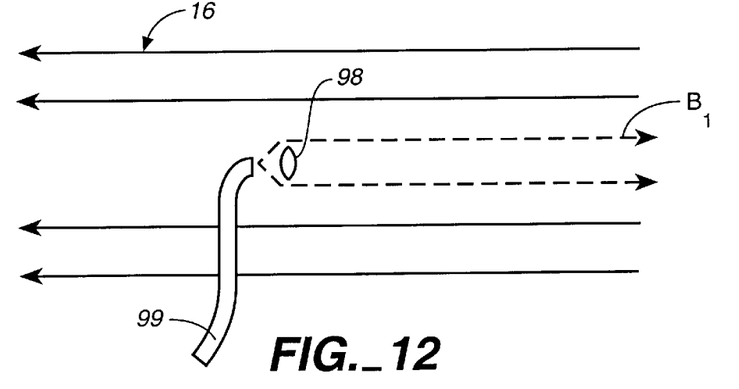

FIG. 12 shows still another example where a fiber source 99 with a lens 98 directs a collimated excitation beam $B_1$ at the objective element. Emission beam 16 passes around lens 98 and fiber source 99 towards the detector.

Figure 13:
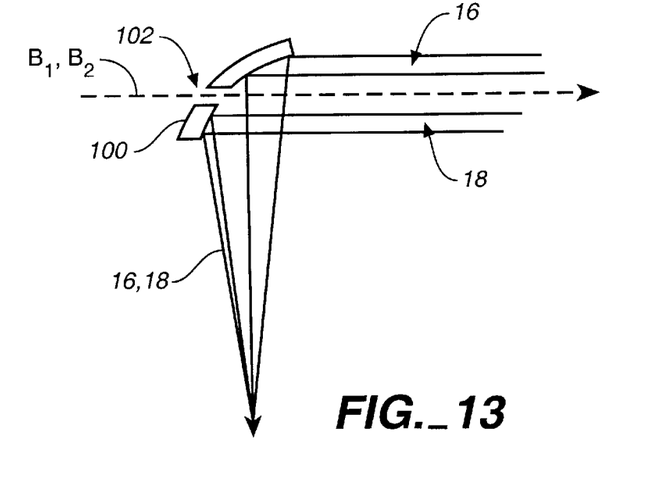

It is also possible to add focusing power to the beamsplitter. In FIG. 13, an off-axis parabolic mirror segment 100 with a hole 102 in its center redirects emission beams 16, 18, focusing them at the detectors. The parabolic mirror shown in FIG. 13 provides a way to combine the excitation and emission beams, as is done by the beamsplitter of FIG. 6, but also focuses the emission beam. The imaging lens used to focus the light onto the detectors can now be omitted, its job performed by the parabolic mirror. A parabolic mirror provides perfect (aberration-free) imaging for a collimated, on-axis, input beam. However, the imaging performance of the parabolic mirror degrades quickly for off-axis imaging, and various shaped lenses may be preferred in certain cases.

C) Detectors

A single detector is currently employed to collect light from each illuminated region of the sample. Two or more detectors may be used to collect light from each spot with, for example, spectral or spatial differences between the light received by the detectors. The emission from the sample may be separated into two or more spectral regions with, for example, a dichroic beamsplitter, a dispersive element such as a prism, or a diffractive element such as a grating.

The preferred detection scheme uses a mirror to divert light from one of the two illuminated spots to one of the detectors, while allowing light from the other illuminated spot to pass undisturbed to the other detector. In a sense, the edge of this mirror is imaged onto the sample, separating it into two non-overlapping "detection" regions.

It is possible reduce the size of these detection regions by placing apertures in front of one or more of the detectors. Inclusion of such apertures does not convert the present system to a confocal microscope. In a confocal microscope, three-dimensional imaging is possible due to the rejection of light from out-of-focus regions of the sample. This is accomplished by simultaneous diffraction limited imaging of a point source and a point detector onto the same point on the sample; these conditions are not met in the current system.

4. Imaging Modes

While the present system is nominally designed for epi-illumination fluorescence imaging, a number of other operating modes are possible. These modes include, but are not limited to, trans-illumination (transmission), darkfield, brightfield, confocal, interferometric, polarization, and differential interference contrast (DIC)

In an epi-illumination system, the source beams illuminate the sample through the same lens as is used to collect light for detection. The present system can be modified to a trans-illumination system by bringing in the illumination from above the sample, while the objective lens collects the resulting fluorescent light from below the sample. Equivalently, the sample can be illuminated from below while the collection lens is placed above the sample. In the trans-illumination fluorescence mode, the portion of the illumination beam that is transmitted by the sample can pass through to the detectors. Separation of the source and fluorescent signals is generally accomplished with spectral filters, and imperfections in these filters (i.e. finite stopband transmission) will reduce the signal-to-noise ratio of the system. The present system uses a novel beamsplitter with a small hole to pass the illumination beams while reflecting the majority of the larger diameter detection beams. In a trans-illumination system, a similar hole can be placed in a fold mirror in the detection path to avoid passage of the transmitted source beams to the detectors.

The present system is suitable for studying the fluorescence properties of DNA chips, such as images with little depth resolution of the type that can determine which sequence of nucleotides is present in sample DNA, or which genes are over- or underexpressed, simply by determining which area of the DNA chip containing complementary DNA sequence is fluorescent. However, the present system can be readily used to study the scattering properties of these and other samples. In the epi-illumination mode, removal of the spectral filters in the detection path(s) will allow collection of light reflected from the sample (although care must be taken to ensure that the reflected source beams reach the detectors, rather than pass through the hole in the beamsplitter). This is also possible in trans-illumination, where transmission and forward scattering of the light will be measured.

Several other imaging modes are possible with modifications to the present system. As discussed above, inclusion of small apertures in front of the detectors, in conjunction with reduced illumination spots, will produce a confocal system. This will allow imaging of thick objects and three-dimensional imaging. Another possibility is use as an interference microscope (a non-fluorescence implementation), where the objective lens will need to include a beamsplitter and reference surface. This allows three-dimensional imaging of reflective objects with subwavelength axial resolution. Polarization and DIC imaging modes are also foreseeable, although they require additional components in the system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A fluorescent optical imaging system, comprising:
   an optical source for generating at least two excitation beams with spatial separation for illuminating on a sample at least two distinct illuminated spots that are spaced apart a predetermined distance,
   the illuminated spots generating at least two emission beams spatially separated,
   a detector for receiving each emission beam, and
   an objective element for directing the excitation beams onto the sample, and wherein
   each detector has a field of view of the sample that is larger than an illuminated spot.

2. The fluorescent optical imaging system of claim 1 wherein,
   the objective element includes a scanning mechanism for directing the excitation beams onto an area of the sample.

3. The fluorescent optical imaging system of claim 2 wherein,
   the scanning mechanism includes means for moving the objective element in a first direction and further comprising means for moving the sample in a second, perpendicular direction.

4. The fluorescent optical imaging system of claim 1 wherein,
   the optical source and the objective element generate the illuminated spots in a manner creating spots that are relatively large spots as compared to diffraction limited spots of a confocal microscope objective element.

5. The fluorescent optical imaging system of claim 1 wherein,
   the excitation and emission beams pass through the objective element and further comprising spatial separation of the excitation and emissions beams.

6. The fluorescent optical imaging system of claim 5 wherein,
   the excitation beams occupy a part of the objective element, and the emission beams occupy substantially all of the objective element.

7. The fluorescent optical imaging system of claim 1 wherein the excitation beams are angularly offset with respect to each other.

8. The fluorescent optical imaging system of claim 7 and further comprising,
   means for spatially separating the emission beams and redirecting the emission beams, each towards their own respective detector.

9. The fluorescent optical imaging system of claim 1 wherein,
   each detector is displaced from a focal point of its respective emission beam.

10. The fluorescent optical imaging system of claim 5 wherein,
    spatial separation of the excitation and emission beams is achieved by means of a mirror with a small optical hole.

11. The fluorescent optical imaging system of claim 5 wherein,
    spatial separation of the excitation and emission beams is achieved by means of a small mirror that is smaller than an emission beam.

12. The fluorescent optical imaging system of claim 5 wherein,
    spatial separation of the excitation and emission beams is achieved by means of a prism.

13. The fluorescent optical imaging system of claim 1 wherein,
    each detector has a field of view of the sample that is also smaller than the distance between two of the spots.

14. The fluorescent optical imaging system of claim 5 wherein,
    the objective element is a lens.

15. The fluorescent optical imaging system of claim 5 wherein,
    the objective element is one of a parabolic mirror, dioptric, catoptic and catadioptric imaging system.

16. A fluorescent optical imaging system comprising:
    an optical source for generating an excitation beam to be directed at a sample to be imaged in a manner generating an emission beam from the sample,
    a detector for receiving the emission beam from the sample,
    an objective element between the optical source and the sample for directing the excitation beam onto the sample and for receiving the emission beam from the sample in a manner where the excitation beam and emission beam at least partially occupy the same space, and
    an optical element for geometrically separating the excitation beam from the emission beam and directing the emission beam towards the detector,
    wherein the excitation beam partially occupies the emission beam at the point of separation of the two beams, and
    wherein, the objective element is one of a parabolic mirror, dioptric, catoptic and catadioptric imaging system.

17. A fluorescent optical imaging system comprising:
    an optical source for generating an excitation beam to be directed at a sample to be imaged in a manner generating an emission beam from the sample,
    a detector for receiving the emission beam from the sample, an objective element between the optical source and the sample for directing the excitation beam onto the sample and for receiving the emission beam from the sample in a manner where the excitation-beam and emission beam at least partially occupy the same space, and an optical element for geometrically separating the excitation beam from the emission beam and directing the emission beam towards the detector, wherein the excitation beam partially occupies the emission beam at the point of separation of the two beams, and wherein, the optical element includes a prism.

18. A fluorescent optical imaging system, comprising:

an optical source for generating an excitation beam to be directed at a sample to be imaged in a manner generating an emission beam from the sample, a detector for receiving the emission beam from the sample, an objective element between the optical source and the sample for directing the excitation beam onto the sample and for receiving the emission beam from the sample in a manner where the excitation beam and emission beam at least partially occupy the same space, and an optical element for geometrically separating the excitation beam from the emission beam and directing the emission beam towards the detector, wherein the excitation beam partially occupies the emission beam at the point of separation of the two beams, wherein the optical source is adapted to generate first and second excitation beams to be directed by the objective element toward the sample in a manner generating first and second emission beams, and wherein, the first and second excitation beams are angularly displaced from each other.

19. A fluorescent optical imaging system, comprising:

an optical source for generating an excitation beam to be directed at a sample to be imaged in a manner generating an emission beam from the sample, a detector for receiving the emission beam from the sample, an objective element between the optical source and the sample for directing the excitation beam onto the sample and for receiving the emission beam from the sample in a manner where the excitation beam and emission beam at least partially occupy the same space, and an optical element for geometrically separating the excitation beam from the emission beam and directing the emission beam towards the detector, wherein the excitation beam partially occupies the emission beam at the point of separation of the two beams, wherein the optical source is adapted to generate first and second excitation beams to be directed by the objective element toward the sample in a manner generating first and second emission beams, and wherein, the first and second excitation beams are parallel to each other and the objective element includes first and second objective lens, one each for an excitation beam.

20. A method of fluorescent optical imaging, comprising the steps of:

generating at least two excitation beams with spatial separation for illuminating on a sample at least two distinct illuminated spots that are spaced apart a predetermined distance, with the illuminated spots generating at least two emission beams spatially separated, directing the excitation beams onto the sample, detecting each emission beam with a detector that has a field of view of the sample that is larger than an illuminated spot.

21. The method of claim 20, and further comprising the step of scanning the excitation beams over the sample to create an image of an area of the sample.

22. The method of claim 21 wherein the step of scanning includes moving an objective element in a first direction and moving the sample in a second, perpendicular direction.

23. The method of claim 20 wherein the illuminated spots are generated in a manner creating spots that are relatively large spots as compared to diffraction limited spots of a confocal microscope objective element.

24. The method of claim 20 wherein the excitation and emission beams pass through an objective element and further comprising the step of spatially separating the excitation and emissions beams.

25. The method of claim 24 wherein the excitation beams occupy a part of the objective element, and the emission beams occupy substantially all of the objective element.

26. The method of claim 20 wherein the excitation beams are angularly offset with respect to each other.

27. The method of claim 26 and further comprising the step of spatially separating the emission beams and redirecting the emission beams, each towards their own respective detector.

28. The method of claim 24 wherein the step of spatially separating the excitation and emission beams is achieved by passing the excitation beams through a mirror with a small optical hole and reflecting the emission beams off of the mirror.

29. The method of claim 24 wherein the step of spatially separating the excitation and emission beams is achieved by reflecting the excitation beams off of a small mirror that is smaller than an emission beams, and allowing the emission beams to pass around the mirror.

30. A method of fluorescent optical imaging comprising the steps of:

generating an excitation beam to be directed at a sample to be imaged in a manner generating an emission beam from the sample, detecting the emission beam from the sample, passing the excitation beam through an objective element and onto the sample and passing the emission beam through the objective element, in a manner where the excitation beam and emission beam at least partially occupy the same space, and geometrically separating the excitation beam from the emission beam and directing the emission beam towards a detector, wherein the excitation beam partially occupies the emission beam at the point of separation of the two beams, wherein a first and second excitation beams are directed by an objective element toward the sample in a manner generating first and second emission beams, and wherein the first and second excitation beams are angularly displaced from each other.

31. A method of fluorescent optical imaging comprising the steps of:

generating an excitation beam to be directed at a sample to be imaged in a manner generating an emission beam from the sample, detecting the emission beam from the sample, passing the excitation beam through an objective element and onto the sample and passing the emission beam through the objective element, in a manner where the excitation beam and emission beam at least partially occupy the same space, and geometrically separating the excitation beam from the emission beam and directing the emission beam towards a detector, wherein the excitation beam partially occupies the emission beam at the point of separation of the two beams, wherein a first and second excitation beams are directed by an objective element toward the sample in a manner generating first and second emission beams, and wherein the first and second excitation beams are parallel to each other and the objective element includes first and second objective lens, one each for an excitation beam.

32. A fluorescent optical imaging system comprising:

an optical source for generating an excitation beam to be directed at a sample to be imaged in a manner generating an emission beam from the sample, a detector for receiving the emission beam from the sample, an objective element between the optical source and the sample for directing the excitation beam onto the sample and for receiving the emission beam from the sample in a manner where the excitation beam and emission beam at least partially occupy the same space, and an optical element for geometrically separating the excitation beam from the emission beam and directing the emission beam towards the detector, wherein the excitation beam partially occupies the emission beam at the point of separation of the two beams, and the optical element is provided with an optical passageway for passing the excitation beam through the optical element while the emission beam is reflected off by the optical element, and wherein one surface of the optical element is coated with a reflective material and the optical passageway defines a small region on the surface free of any reflective material so that the excitation beam passes through the small region while the emission beam is reflected off by the coated reflective material.

33. A fluorescent optical imaging system comprising:

an optical source for generating an excitation beam to be directed at a sample to be imaged in a manner generating an emission beam from the sample, a detector for receiving the emission beam from the sample, an objective element between the optical source and the sample for directing the excitation beam onto the sample and for receiving the emission beam from the sample in a manner where the excitation beam and emission beam at least partially occupy the same space, and an optical element for directing the excitation beam toward the objective element, wherein the optical element is substantially small so that the emission beam transmits around the optical element.

34. The fluorescent optical imaging system of claim 33 wherein the optical element is a small mirror that reflects and directs the excitation beam to the objective element and the emission beam transmits around the small mirror.

35. The fluorescent optical imaging system of claim 33 wherein the optical element includes a fiber source and lens for directing the excitation beam while the emission beam transmits around the lens and fiber source.

36. A method of fluorescent optical imaging comprising the steps of, generating an excitation beam to be directed at a sample to be imaged in a manner generating an emission beam from the sample, detecting the emission beam from the sample, passing the excitation beam through an objective element and onto the sample and passing the emission beams through the objective element, in a manner where the excitation beam and emission beam at least partially occupy the same space, and geometrically separating the excitation beam from the emission beam and directing the emission beam towards the detector using a small optical element wherein the excitation beam is directed by the small optical element while the emission beam transmits around the small optical element, wherein the excitation beam partially occupies the emission beam at the point of separation of the two beams.

37. The method of claim 36 wherein the step of geometrically separating the excitation and emission beams includes use of a small mirror that is smaller than an emission beam.

* * * * *